(12) United States Patent
Baldwin et al.

(10) Patent No.: US 10,764,769 B2
(45) Date of Patent: Sep. 1, 2020

(54) DIRECT INTERACTION BETWEEN A USER AND A COMMUNICATION NETWORK

(71) Applicant: AT&T Intellectual Property I, L.P., Atlanta, GA (US)

(72) Inventors: Christopher Baldwin, Algonquin, IL (US); Bruce Barnes, Pingree Grove, IL (US); Wayne R. Heinmiller, Elgin, IL (US); Patrick Kenny, Barrington, IL (US); Shadi Khoshaba, Skokie, IL (US); Dolores J. Mallian, St. Charles, IL (US); Nikhil S. Marathe, Roselle, IL (US); Charles M. Stahulak, Chicago, IL (US); Michael Towster, Barrington, IL (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 260 days.

(21) Appl. No.: 15/267,429

(22) Filed: Sep. 16, 2016

(65) Prior Publication Data
US 2017/0006487 A1   Jan. 5, 2017

Related U.S. Application Data

(63) Continuation of application No. 14/091,894, filed on Nov. 27, 2013, now Pat. No. 9,451,434.

(51) Int. Cl.
*G06F 3/048* (2013.01)
*H04W 24/08* (2009.01)
(Continued)

(52) U.S. Cl.
CPC ............ *H04W 24/08* (2013.01); *G06F 3/017* (2013.01); *G06F 3/048* (2013.01); *G06F 3/16* (2013.01);
(Continued)

(58) Field of Classification Search
CPC . G06F 3/048; G06F 3/017; G06F 3/16; H04L 69/08; H04L 65/102; H04L 67/22; H04W 24/08; H04W 4/90; H04W 4/16
See application file for complete search history.

(56) References Cited

U.S. PATENT DOCUMENTS 8,433,041 B2   4/2013   Clark et al.
9,161,195 B1   10/2015  Nix
(Continued)

OTHER PUBLICATIONS

Romano, Benjamin "UW Tech Turns Home WiFi Network Into Gesture Control System", http://www.xconomy.com/seattle/2013/06/11/uw-tech-turns-home-wifi-network-into-gesture-control-system; downloaded from web Nov. 27, 2013; 5 pgs.
(Continued)

*Primary Examiner* — Xuyang Xia
(74) *Attorney, Agent, or Firm* — Cantor Colburn LLP

(57) ABSTRACT

A mechanism is provided for direct interaction between an individual and a communication network. Captured data is received of the individual in an environment to be analyzed by a network management computer. The data is captured by network sensors. The network management computer determines that the individual is a subscriber to services of the communication network by identifying the subscriber from the data that has been captured. The subscriber is registered with a network carrier that operates and provides the services on the communication network. The data is obtained without assistance from a subscriber owned device providing the data. The data is analyzed to interpret commands when presented by the subscriber via the network sensors. The commands include gesture commands from the subscriber. An action is performed for the subscriber based on the commands.

20 Claims, 5 Drawing Sheets

(51) Int. Cl.
  *H04W 4/029* (2018.01)
  *H04W 4/90* (2018.01)
  *H04L 29/08* (2006.01)
  *H04L 29/06* (2006.01)
  *G06F 3/01* (2006.01)
  *G06F 3/16* (2006.01)
  *H04W 4/16* (2009.01)

(52) U.S. Cl.
  CPC .............. *H04L 67/22* (2013.01); *H04L 69/08* (2013.01); *H04W 4/029* (2018.02); *H04W 4/16* (2013.01); *H04W 4/90* (2018.02)

(56) References Cited

U.S. PATENT DOCUMENTS

| | | | |
|---|---|---|---|
| 2007/0005988 A1* | 1/2007 | Zhang | G06F 21/32 713/186 |
| 2007/0217396 A1 | 9/2007 | Su | |
| 2009/0027337 A1 | 1/2009 | Hildreth | |
| 2009/0278915 A1 | 11/2009 | Kramer et al. | |
| 2010/0073287 A1 | 3/2010 | Park et al. | |
| 2010/0149090 A1* | 6/2010 | Morris | G06F 3/017 345/156 |
| 2011/0202270 A1 | 8/2011 | Sharma et al. | |
| 2011/0260884 A1* | 10/2011 | Yi | G07C 5/008 340/870.02 |
| 2012/0150966 A1 | 6/2012 | Fan et al. | |
| 2012/0197911 A1* | 8/2012 | Banka | H04L 67/12 707/752 |
| 2012/0280901 A1 | 11/2012 | Kim | |
| 2013/0027503 A1 | 1/2013 | Hildreth | |
| 2013/0127980 A1 | 5/2013 | Haddick et al. | |
| 2013/0185750 A1* | 7/2013 | Ayoub | H04N 21/25841 725/34 |
| 2013/0201316 A1 | 8/2013 | Binder et al. | |
| 2013/0225290 A1 | 8/2013 | Zhou et al. | |
| 2013/0241830 A1 | 9/2013 | Ohta | |
| 2013/0246050 A1 | 9/2013 | Yu et al. | |
| 2014/0172707 A1* | 6/2014 | Kuntagod | G06Q 20/40145 705/44 |
| 2015/0039415 A1* | 2/2015 | Boldyrev | G06Q 30/0242 705/14.41 |
| 2015/0067176 A1* | 3/2015 | Dubois | H04L 69/08 709/227 |
| 2015/0081418 A1 | 3/2015 | Sahai | |

OTHER PUBLICATIONS

The Volt Report Presented by Martians on Earth "Wi-Fi Network Utilized to Recognition Human Gestures to Operate the Gadgets, Whoa" http://www.thevoltreport.com/wi-fi-network-wisee-gesture-control-commanded, downloaded Nov. 27, 2013; 8 pgs.

U.S. Appl. No. 14/091,894, "Direct Interaction Between a User and a Communication Network", Non-Final Office Action dated Oct. 23, 2015, pp. 1-19.

U.S. Appl. No. 14/091,894, "Direct Interaction Between a User and a Communication Network", Notice of Allowance dated May 18, 2016, pp. 1-13.

Zivkovic et al., "Toward low latency gesture control using smart camera network", 2008 IEEE, 8 pgs.

\* cited by examiner

DIRECT INTERACTION BETWEEN A USER AND A COMMUNICATION NETWORK

PRIORITY

This application claims priority to U.S. Non-Provisional application Ser. No. 14/091,894, filed Nov. 27, 2013, the contents of which are incorporated herein by reference in their entirety.

BACKGROUND

The present disclosure relates generally to communication services by a carrier, and more particularly, to techniques for enabling a user to interact directly with a wired/wireless carrier network with or without the use of a subscriber owned device.

A mobile network operator or MNO (also known as a wireless service provider, wireless carrier, cellular company, or mobile network carrier) is a provider of wireless communications services. The MNO owns or controls all the elements necessary to sell and deliver services to an end user including radio spectrum allocation, wireless network infrastructure, back haul infrastructure, billing, customer care and provisioning computer systems and marketing, customer care, provisioning and repair organizations.

In addition to obtaining revenue by offering retail services under its own brand, an MNO may also sell access to network services at wholesale rates to mobile virtual network operators or MVNOs. A key defining characteristic of a mobile network operator is that an MNO must own or control access to a radio spectrum license from a regulatory or government entity. A second key defining characteristic of an MNO is that an MNO must own or control the elements of the network infrastructure that are necessary to provide services to subscribers over the licensed spectrum.

A MNO typically also has the necessary provisioning, billing and customer care computer systems and the marketing, customer care and engineering organizations needed to sell, deliver and bill for services. However, the MNO can outsource any of these systems or functions and still be considered a MNO.

BRIEF SUMMARY

Exemplary embodiments include a method for direct interaction between an individual and a communication network. The method includes receiving data captured of the individual in an environment to be analyzed by a network management computer. The data is captured by network sensors. The network management computer determines that the individual is a subscriber to services of the communication network by identifying the subscriber from the data that has been captured. The subscriber is registered with a network carrier that operates and provides the services on the communication network. The data is obtained without assistance from a subscriber owned device providing the data. The data is analyzed to interpret commands when presented by the subscriber via the network sensors. The commands comprise gesture commands from the subscriber. An action is performed for the subscriber based on the commands.

Other exemplary embodiments include an apparatus. The apparatus includes a processor, and memory comprising computer-executable instructions that, when executed by the processor, cause the processor to perform operations for direct interaction between an individual and a communication network. The operations include receiving data of the individual in an environment to be analyzed and determining that the individual is a subscriber to services of the communication network by identifying the subscriber from the data that has been captured. The data is captured by network sensors. The subscriber is registered with a network carrier that operates and provides the services on the communication network. The data is obtained without assistance from a subscriber owned device providing the data. The data is analyzed to interpret commands when presented by the subscriber via the network sensors. The commands comprise gesture commands from the subscriber. An action is performed for the subscriber based on the commands.

Other exemplary embodiments include a computer program product, tangibly embodied on a computer readable medium, for direct interaction between an individual and a communication network. The computer program product includes instructions that, when executed by a processor, cause the processor to perform operations. The operations include receiving data captured of the individual in an environment to be analyzed, and determining that the individual is a subscriber to services of the communication network by identifying the subscriber from the data that has been captured. The data being captured by network sensors. The subscriber is registered with a network carrier that operates and provides the services on the communication network. The data is obtained without assistance from a subscriber owned device and without the subscriber owned device providing the data. The data is analyzed to interpret commands when presented by the subscriber via the network sensors. The commands comprise gesture commands from the subscriber. An action is performed for the subscriber based on the commands.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF EXEMPLARY EMBODIMENTS

Referring now to the drawings wherein like elements are numbered alike in the several FIGURES.

The detailed description explains the exemplary embodiments, together with advantages and features, by way of example with reference to the drawings.

DETAILED DESCRIPTION OF DRAWINGS

Subscriber owned devices create several issues not only for the subscribers themselves, but also for wireless carriers and application developers. Physical mobile devices can be lost, damaged, or stolen leaving the subscriber without a means of communication. This can be especially problematic if the user needs to contact emergency services.

Also, wireless carriers often subsidize the cost of mobile devices to make them more attractive to individual users resulting in large upfront costs (likely) without any guarantee of a positive return on investment. Application developers struggle to ensure their applications are available and operate properly for all users, but fragmentation of operating systems across versions occurs as well as across different operating systems. This becomes difficult (potentially costly) and performance can be adversely affected.

According to exemplary embodiments, a system and method use gesture and speech commands to control remote devices and remote systems including the network itself. This disclosure presents a system and method for enabling a user to interact directly with a wireless carrier network without the use of a subscriber owned device.

Figure 1:
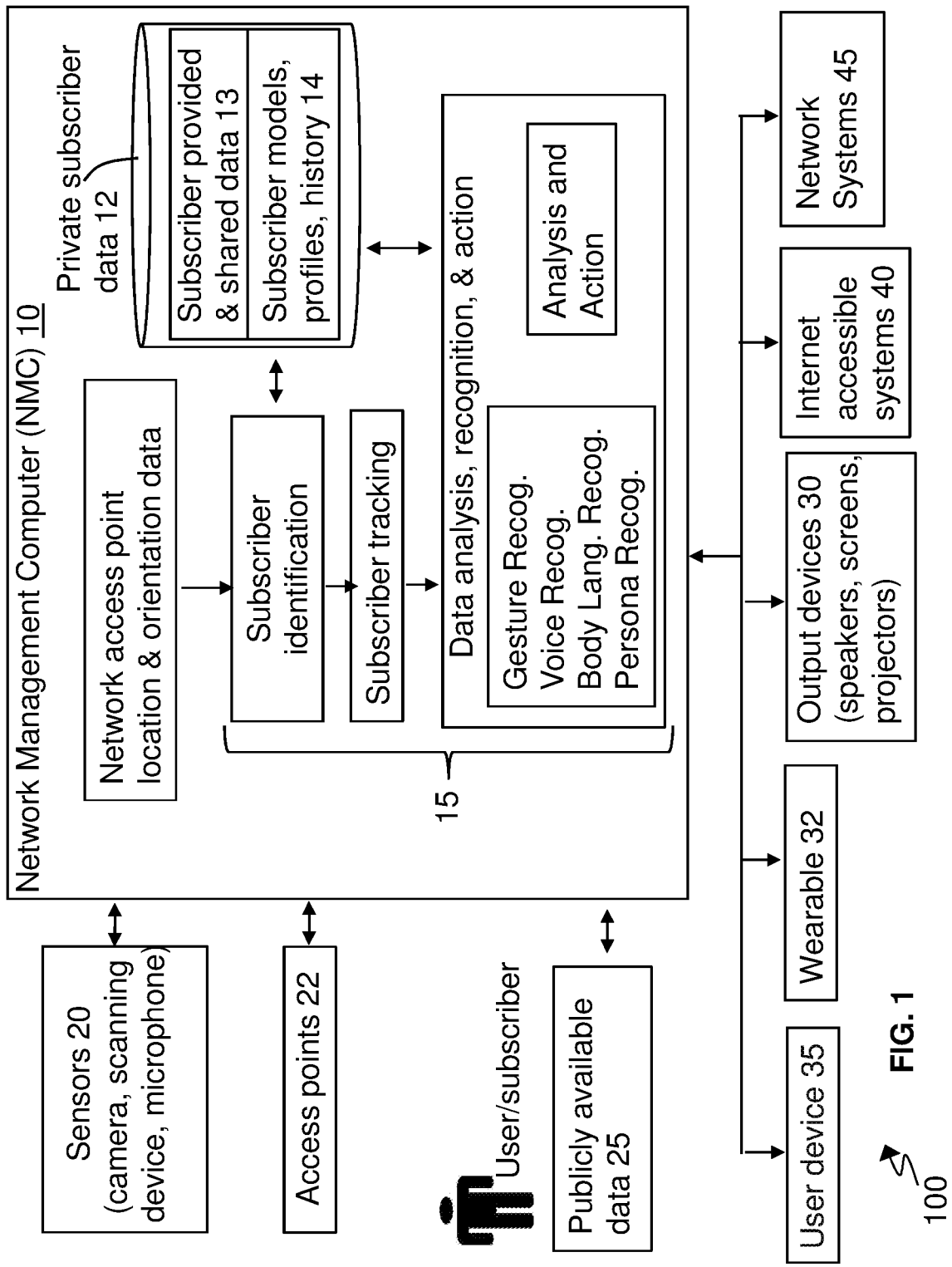
FIG. 1 illustrates a wireless and/or wired communication network and system according to exemplary embodiments.

FIG. 1 illustrates a wireless and/or wired communication network 100 according to an exemplary embodiment. The communication network 100 enables a user (such as a subscriber) to interact directly with the wireless and/or wired carrier communication network 100 without requiring the use of a subscriber owned device. The subscriber owned device represents various types of user owned devices 35 normally utilized to connect to cell towers in cell sites, Wi-Fi access points, satellites, and so forth. The user owned devices 35 may represent cell phones, smart phones, tablets, laptops, computers, etc.

The communication network 100 includes a network management computer (NMC) 10 that may implement cloud computing, and the communication network 100 creates an always on platform for users to interact with. The network management computer (NMC) 10 may be a single server, a group of servers, and/or various servers seamlessly and cooperatively operating together on the communication network 100 according to exemplary embodiments as discussed herein. The communication network 100 is owned, operated, and controlled by a carrier such as AT&T®. The carrier is a communications service provider (CSP). The communications service provider is the entity that transports information electronically, and is also referred to as a telecommunications service provider. The term communications service provider (or telecommunications service provider) encompasses public and private companies in the telecom (landline and wireless) service provider business, Internet service provider (ISP) business, cable service provider business, satellite service provider business, managed services businesses, and/or a combination thereof.

The carrier operates and controls the communication network 100 (including one or more network management computers 10) in order to provide services to the carrier's subscribers. Subscribers register in advance for the services offered by the carrier.

In this cloud based management system implementation, the network management computer 10 is designed for direct communication with and control between the user and the communication network 100. The network management computer 10 is responsible for (1) identifying an individual as a user, (2) coordinating tracking of the user, (3) aggregating and analyzing data to interpret commands from the user as well as the user's intent, behavior, mood, etc., (4) acting on the user's behalf without commands from the user, (5) acting on the user's behalf in response to user commands, (6) determining the appropriate means of relaying information, data, communication, etc. to the user, and/or (7) carrying out these communications to the user and actions on behalf of the user.

Various example scenarios are discussed herein for explanation purposes and not limitation. The network management computer 10 may receive data (including images, video, audio, etc.) from network sensors 20. The network sensors 20 are operatively connected to network access points 22 that provide direct connection to the communication network 100 including the network management computer 10. The network sensors 20 may be located at (e.g., collocated) and/or near the network access points 22. The network access points 22 provide wireless connections to the network sensors 20. For example, network access points 22 may be cell towers (corresponding to cell sites), satellites, Wi-Fi routers, and/or any type of device capable of transmitting and receiving electromagnetic waves for bidirectional communication with the network sensors 20. The network access points 22 may provide wired connections to the network sensors. For example, the network access points 22 may be (via) Ethernet cables, fiber optic cables, copper cables, and/or other wired connections capable of transmitting and receiving signals for bidirectional communication with the network sensors 20. The network sensors 20 may include cameras, microphones, scanning devices, and other sensors as understood by one skilled in the art. In one implementation, the network sensors 20 (e.g., video cameras, microphones, scanning devices, etc.) may be incorporated into the network access points 22 and contained within the same housing/case as the network access points 22.

One or more software applications 15 of the network management computer 10 analyze this captured data of the user and compare the captured data against existing indexed records to identify subscribers. These index records may include captured audio, images, video, etc., captured in the past, and the index records enable the network management computer 10 to use several techniques to identify and match an individual as an actual subscriber to services of the communication network 100. When the software application 15 is analyzing and comparing the captured data to the stored index records in order to identify the user, these identification techniques include identifying the user by, e.g., facial recognition, gait recognition, speech pattern recognition, voice recognition, bio-morph identification, clothing identification, etc. These index records are private subscriber data including subscriber provided and shared data 13 and network created subscriber models, profiles, and history 14. The subscriber provided and shared data 13 may include contacts (names, telephone numbers, email addresses of friends, family, and associates), pin numbers, usernames and passwords for various websites (including account information for bank accounts, pay accounts, social media sites, and so forth), subscriber preferences, aliases/nicknames, schedules/calendars, etc. For each of the subscribers, the indexed records are stored in a private subscriber database 12 in the network management computer 10. Additionally, the indexed records may be stored in identification and tracking systems such as the home location register (HLR), visitor location register (VLR), or some other location.

The subscriber provided and shared data 13 is input and customized by the subscriber himself in advance. The subscriber provided and shared data 13 may include customized gestures that are set by the subscriber to cause the network management computer 10 to perform identified user actions. The network created subscriber models, profiles, and history 14 are created by the network management computer 10 according to past history, movement, routines, and actions performed by and associated with the subscriber. Accordingly, the network management computer 10 creates models and profiles of subscriber's past behavior which can be utilized to predict the subscriber's future intents and behavior even when the subscriber does not actively request a command.

Once the user has been identified by the network management computer 10 (e.g., using facial recognition and/or gait), the network management computer 10 may coordinate tracking of this individual at individual network access points 22 (e.g., cell sites) in the communication network 100 itself. As an individual moves through an area (while being tracked), the tracking coverage (by the network sensors 20) of that area may change to include additional and/or different network access points 22 (for network sensors 20).

Figure 2:
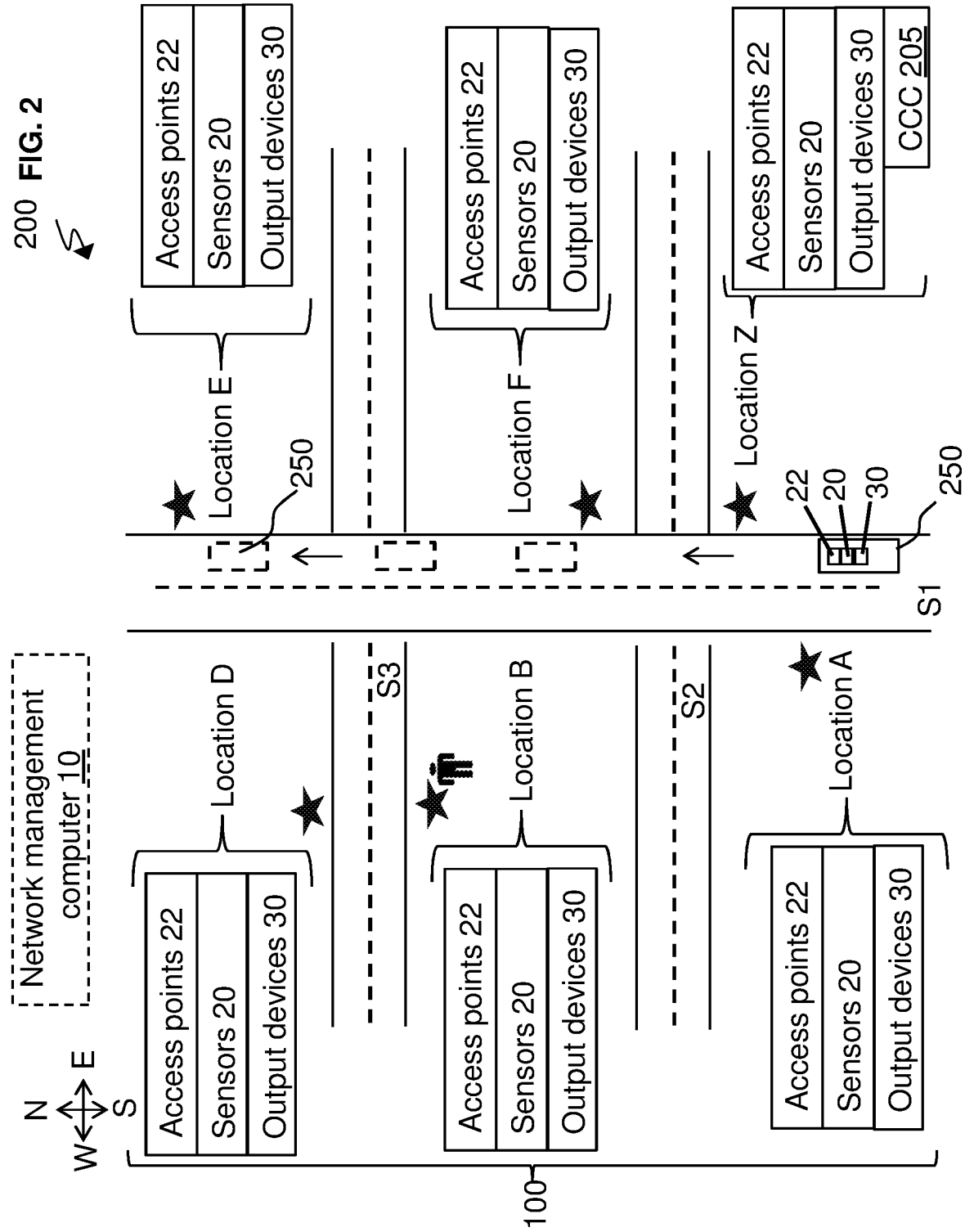
FIG. 2 illustrates the wireless/wired communication network in an environment according to exemplary embodiments.

The network management computer 10 utilizes knowledge of the user's movements through the space (as well as historical patterns in the subscriber models, profiles, and history 14) to determine which network sensors 20 connected to the network access point(s) 22 may be best to continue tracking the subscriber in the space of an environment 200 as shown in FIG. 2. FIG. 2 illustrates the wireless/wired communication network 100 in the environment 200 according to exemplary embodiments. So as not to obscure the figure, every detail of the communication network 100 is not repeated in the environment 200 but it is understood that the details are present in FIG. 2.

In addition to tracking the subscriber, the network management computer 10 utilizes the captured data to identify all subscriber commands (e.g., gestures, speech, etc.) that have been presented by the subscriber. The accuracy of this analysis to identify subscriber commands can be enhanced by using past historical records, trends, habits, and/or mannerisms of the subscriber to build a more accurate model (stored in models, profiles, and history 14) for comparing the currently captured data against.

These commands (e.g., gestures, speech, etc.) may be standardized, user customized, and/or completely user generated. Acceptable commands and their corresponding action may be stored within network management computer 10 and/or at another location. The accuracy of the interpretation of the commands by the network management computer 10 may be further enhanced by contextual cues, perceived/inferred user persona, etc. For example, speech used for a certain command may vary based on where a user is, what the user is doing, mood, recent events, and so forth, and the network management computer 10 takes all of these factors into account when interpreting the subscriber's commands. Further, the network management computer 10 utilizes all available data including the captured data previously mentioned as well as any data the user has provided (or otherwise given access to) such as a schedule, as well as any publicly available data 25 to determine context, persona, etc. Publicly available data 25 may include data from social media sites, government provided data, mapping and address sites, telephone data, and so forth.

Given that the network management computer 10 has access to all of this data, the network management computer 10 can utilize prediction logic of the software application 15 to act on the user's behalf without (first) being instructed to through gesture, speech, and/or any other kind of subscriber commands, all of which represents the subscriber's intent. When acting on the subscriber's behalf without being instructed to by the subscriber, these actions may be set preferences, such as schedule and reschedule appointments, make pickups and deliveries, make purchases, initiate calls, send messages, etc.

After determining that the subscriber has issued a command, the network management computer 10 carries out the corresponding action on the user's behalf. In some cases, performing the command involves some level of discretion on the part of network management computer 10 such as, e.g., a message might need to be sent once a user reaches a certain location. In this situation, the network management computer 10 analyzes historical behavior as well as all of the data previously mentioned to determine the appropriate interpretation, and thus what time to send the message. Assume that the message that the subscriber wants to send to her husband (at home, at a restaurant, or at the game) is "I'll be there in 30 minutes". The network management computer 10 knows the current location of the subscriber and the recipient husband. Based on mapping data obtained by the network management computer 10 and based on whether subscriber is moving a speed corresponding to walking or diving, the network management computer 10 sends the message when the network management computer determines that the subscriber is approximately 30 minutes away from the recipient's location. Note that even if the subscriber has not provided commands to send any message to the recipient husband, the network management computer 10 still sends the message "I'll be there in 30 minutes" to the recipient husband on the subscriber's behalf without being instructed, and this represents the subscriber's intent as inferred by the network management computer 10.

Network systems 45 represent internal servers, switches, routers, and so forth having functionality offered and utilized by the network carrier. The network systems 45 may represent email servers, text messaging servers, storage servers, voice servers and switches, video servers and switches, programming equipment, etc., and all of which can be provided for, to, and on behalf of the subscribers. Internet accessible systems 40 represent the various external servers, switches, routers, and Internet accessible functionality provided externally such as by entities other than the network carrier of the subscriber. The network management computer 10 may connect to the Internet accessible systems 40 (e.g., via pre-stored usernames and passwords for the subscriber), and cause the Internet accessible systems 40 to execute on behalf the subscriber. The Internet accessible systems 40 include external servers, external pay account servers (e.g., such as PayPal™), external website servers, external business servers, home computer systems for managing homes, etc.

When information, data, communication, and so forth need to reach a subscriber that does not have his subscriber owned device, the network management computer 10 analyzes available options in the vicinity (e.g., walking distance) of the subscriber to determine the best location and method for communicating the information to the subscriber. This may involve an initial communication to the subscriber at a first location (e.g., locations A though Z) instructing him to go to a second location where the actual communication exchange will take place. In one example, the environment 200 is an urban city with various locations A through Z that have their own sensors 20, access points 22, and/or output devices 30. Each location A through Z has its own location/orientation data including global positioning data, street address, longitude and latitude, waypoints, etc., stored in the network management computer 10. By having all of the location data for each of the locations A through Z, the network management computer 10 can identify and track via continuously captured data the subscriber throughout the environment 200 and guide the subscriber through the environment 200 as needed. For example, each location A through Z is shown with its own sensors 20, access points 22, and output devices 30. Continuing the scenario in which the network management computer 10 instructs the subscriber at the first location such as location B to traverse (e.g., walk) to the second location such as location F, the network management computer 10 may utilize speakers of the output device 30 at location B to verbally instruct the subscriber to walk 200 feet north across the street S1 and 100 feet south in order to reach location F. Location B may only have speakers as the output device 30 but location F has both speakers and a display screen as its output device 30. For the communication exchange to occur, the network management computer 10 determines that information needs to be displayed to the subscriber, finds the closest location that has a display screen for the output device 30, and instructs the subscriber how to reach the nearby location. Although the network management computer 10 determines that location D is closer to the subscriber at location B, the network management computer 10 recognizes that location D (only) has speakers as the output device 30 but does not have the needed display screen. Note that this same process of guiding the subscriber from one location to another location (via verbal instructions and/ore displayed instructions on the output devices 30) is utilized by the network management computer 10 to guide the subscriber away from a harmful threat and to emergency services personnel.

Note that the methods utilized by the network management computer 10 to communicate with the subscriber vary depending on the availability of different systems of the output devices 30 (e.g., speakers (could be directed audio), screens, projectors, electronic billboards, etc.) at the particular location. In some cases there may be multiple network access points 20 covering a particular area. In these situations, the network management computer 10 may utilize captured data from these multiple sources to create composite images, videos, etc., of the subscriber from the sensors 20 at each of the nearby locations. For example, when the subscriber is at location B, cameras from location A, B, D, and F may be pointed, angled, and zoomed toward the subscriber B. The composite images and videos (e.g., both audio and video) from each of the sensors 20 are utilized by the network management computer 10 to eliminate missed gestures due to obstructed views as well as help remove audio interference and background noise.

Returning to the scenario of the subscriber being instructed to walk from location B to location F, once the subscriber walks to location F, the sensors 20 can capture the user's face, and the network management computer 10 again identifies the identity of the subscriber using facial recognition. Once identified as the subscriber, the network management computer 10 can display to the subscriber a video message (and/or text message) on the display screen and speakers of the output device 30 at location F. The video message may be from the subscriber's spouse, child, child's school, and/or parents. The subscriber can provide a command through a gesture and/or voice command via the cameras and microphone of the sensors 20 at the location F, and the subscriber command can instruct the network management computer 10 to send a video message (and/or text message) back to the sender. Also, the subscriber can present subscriber commands to the sensors 20 in which the subscriber commands instruct the network management computer 10 to send a video message, text message, and/or call to another recipient that is different from the original sender.

Via the sensors 20 and output devices 30 at location F, the network management computer 10 can provide real-time, near real-time, and/or delayed communications between the subscriber and any other person all while the subscriber is not in possession of a subscriber owned device (e.g., such as a mobile phone). At the location F, the subscriber may choose to call any contact in his contact lists which is stored on the network management computer 10, and the network management computer 10 executes instructions to place the call to the contact. At this point when placing the call to the contact, the subscriber has the option of utilizing the network sensors 20 and network output devices 30 (which are under the control and authority of the carrier and are not subscriber owned devices) to communicate with the contact. Since the sensors 20 (e.g., microphone) and output devices 30 (e.g., speaker) may be in a public location, others may be able to listen in on the subscriber's call to the contact. Accordingly, the subscriber may be able to connect to the sensors 20 and/or output devices 30 via wearable devices 32 which can include earpieces, headsets, wristwatches, glasses, etc., by using Bluetooth® technology. By talking with the contact through the wearable device 32 that is now connected to the sensors 20 and/or output devices 30 at location F, the subscriber can have a private conversation with the contact who was just called by the network management computer 10, and bystanders are unable to listen in on the conversation. It is noted that the wearable device 32 does not have dialing capability, and the subscriber relies on commands to the network management computer 10 to place the call to the correct contact.

Although all the communication exchanges along with identification and tracking of the subscriber can be performed without using a subscriber owned device (physical user owned device 35 such as a cell phone), simply because a user may not require the use of a physical device to interact with the network management computer 10 does not mean that use of a subscriber owned device is prohibited or unsupported. Exemplary embodiments can provide direct communication between the subscriber and the communication network 100 in addition to the use of the physical user owned device 35 (even concurrent). In some cases, the subscriber may be using the subscriber owned device (physical device) in some way and may issue a command via a gesture which instructs the communication network 100 (network management computer 10) to make some change to the subscriber owned device being used. This type of exchange could simplify physical user owned devices 35 and provide opportunities for changing their appearance. This is especially true of wearable devices 32. As discussed above, an example of this might be a headset that a user wears (such as a Bluetooth® headset) that connects to the communication network 100 (such as the sensors 20, access points 22, and/or output devices 30), rather than a subscriber owned device (physical user owned device 35). In this type of situation calls can be initiated and terminated through speech and/or gesture commands captured by the sensors 20. Volume could be adjusted using captured gestures command to the network management computer 10 as well without the subscriber having to select a volume button on the user owned device 35. This also gives the network management computer 10 another way in which to communicate information to the user. The simplicity of such wearable devices 32 enables new innovations such as disposable wearable devices. To increase innovation in the wireless area all and/or part of the network management computer 10 as well as the physical sensors 20 (cameras, microphones, scanning devices) and output devices 30 (speakers, display screens)

located on network access points 22 may be opened up to developers via application programming interface (APIs).

Note that the environment 200 having the communication network 100 may represent small cells such as connected cars, homes, businesses, and/or other connected devices. Assume that the locations A through Z may be various homes in a community in which residents have signed up as a subscriber for the services of the carrier for the communication network 100. In this example, it may be assumed that some homes have their own subscriber owned sensors 20, subscriber owned access points 22, subscriber owned output devices 30, while some homes have network (owned) sensors 20, network (owned) access points, and network (owned) output devices 30, all of which are connected and communicate with the network management computer 10 as discussed herein. The subscriber may leave his home at location Z and walk to the neighbor's home at location B. The subscriber may have a home control center computer (CCC) 205 that connects to and securely controls all aspects of his home at location Z. The control center computer 205 includes computer executable instructions to control home systems including appliances, the heating, ventilation, and air conditioning system, the security system, the home entertainment system, the sprinkler system, the lighting system, garage system, vehicle systems, and so forth. While at the neighbor's home at location B, the subscriber may realize that he failed to perform a task. Also, while at the neighbor's home, the subscriber may stand in front of and/or speak to the sensor 20 in order for the network management computer 10 to identify the subscriber as a registered user of the services offered by the carrier (e.g., AT&T®). The network management computer 10 may acknowledge/confirm the subscriber's identity by saying (through the output device 30), "Hello Mr. Smith. I see that you are visiting Mr. Jones today". Once identified by the network management computer 10 and while the subscriber is at the neighbor's home at location B, the subscriber (Mr. Smith) can control any of the home systems at his home at location Z, all while not using (and not requiring) Mr. Smith to possess a subscriber owned device. For example, the subscriber (Mr. Smith) can present gesture commands and/or speech commands to the sensors 20 (at location B), and the commands cause the network management computer 10 to communicate with the control center computer 205 to cause the lights to turn on/off, the security system to turn on/off, the appliances to turn on/off, the HVAC system to turn on/off, to garage doors to open/close, etc. In one case, the functionality of the control center computer 205 may be completely or partially integrated into the computer-executable instructions of the network management computer 10, such that the control center computer 205 may be omitted. Note that the home control center computer 205 represents one of the Internet accessible systems 40.

Additionally, there may be a scenario in which the subscriber has been walking in the environment 200, and the network management computer 10 is tracking the movements of the subscriber via the sensors 20 (e.g., tracking the subscriber at the various locations A through Z). Assume that the subscriber has entered a vehicle 250. The network management computer 10 now tracks the subscriber's movement by tracking the vehicle 250 that the subscriber has boarded (e.g., bus, train, car, plane, etc.), and the network management computer 10 tracks the vehicle 250 until the subscriber exits the vehicle. The network management computer 10 can track vehicles, such as the vehicle 250, by visible markings (including identifying registration numbers), tag numbers, make and model of the vehicle, etc., which are captured by the sensors 20. From the captured data, the network management computer 10 identifies the vehicle 250 as the vehicle travels from one location to another location. Also, the network management computer 10 can track the vehicle 250 by location information generated and shared by the vehicle 250 itself via an onboard network access point 22. In addition to the onboard network access point 22, the vehicle 250 may be equipped with sensors 20 for identifying the subscriber and receiving commands in the vehicle 250 and output devices 30 for communicating with the subscriber in the vehicle 205.

Figure 3:
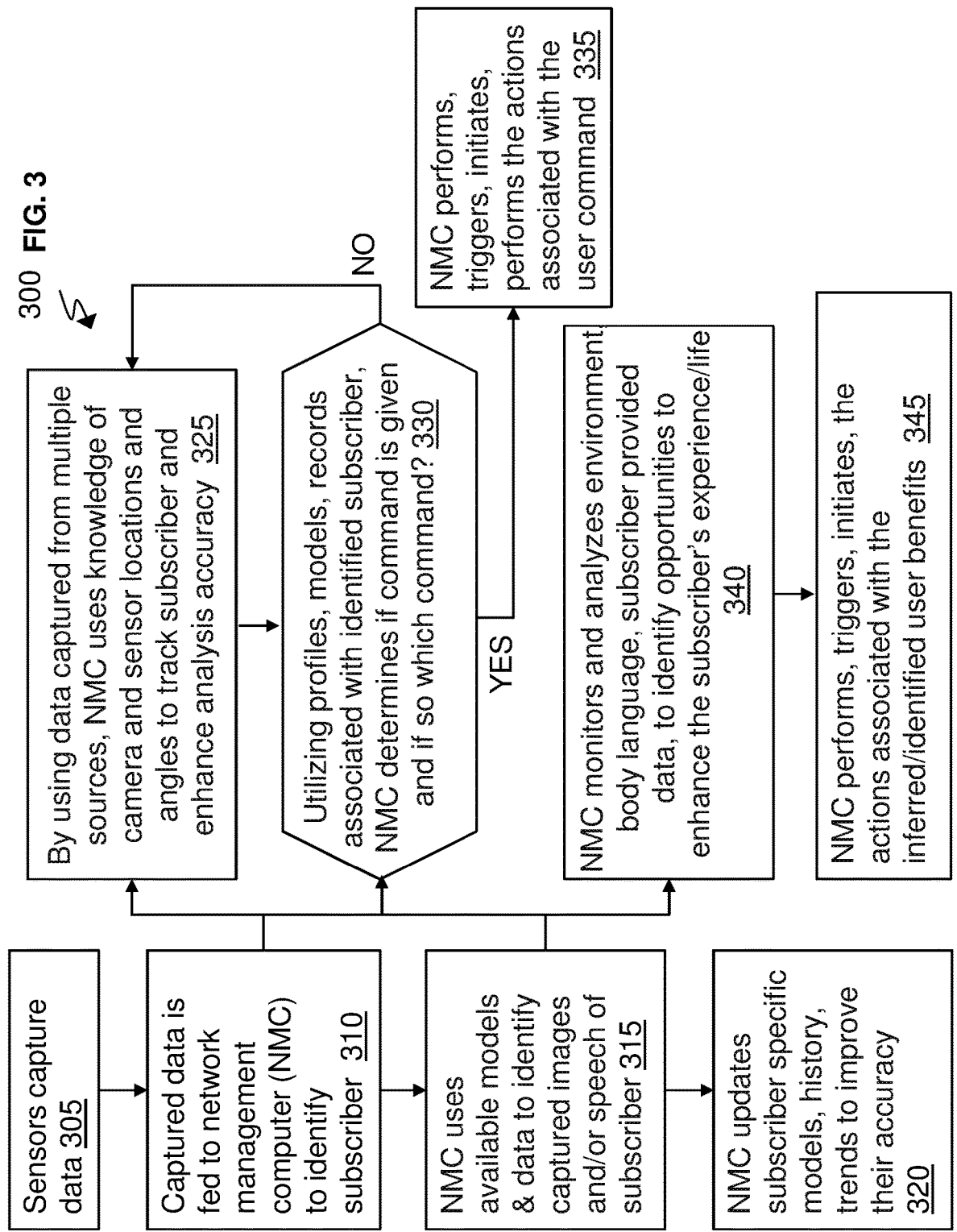
FIG. 3 illustrates a process flow of utilizing the communication services of the carrier for the communication network without requiring the subscriber to have a subscriber owned device according to exemplary embodiments.

FIG. 3 illustrates a process flow 300 of utilizing the communication services of the carrier for the wireless and/or wired communication network 100 without requiring the subscriber to have and/or communicate with a subscriber owned device (i.e., a cell phone, smart phone, laptop, etc.) although the subscriber owned device may be used according to an exemplary embodiment.

The network sensors 20 (which may include sensors of a business entity, home, etc., registered for the services) capture data of an individual at block 305. Cameras, microphones, and other sensors located with and/or near network access points 22 (e.g., cell sites) capture the data of the individual.

The captured data is retrieved by and/or fed to the network management computer 10 from the respective network sensors 20 at block 310.

At block 315, the network management computer 10 utilizes available models and data to match captured images and/or speech of subscriber to identify the individual as the subscriber to the communication services. There are many techniques the network management computer 10 may utilize to identify and verify the identity of subscribers such as facial recognition, gait recognition, etc. Additionally, methods of capturing information by the sensors 20 may include changes to propagating signals (such as Wi-Fi signals) resulting from the presence and movements of a user, which is known as WiSee. Reference can be made to "Whole-Home Gesture Recognition Using Wireless Signals" by Qifan Pu, Sidhant Gupta, Shyam Gollakota, Shwetak Patel, published at The 19th Annual International Conference on Mobile Computing and Networking (Mobicom '13), which is herein incorporated by reference.

At block 320, the network management computer 10 updates the subscriber specific models, history, trends, etc. (stored as the shared data 13 and profile history 14 of the private subscriber database 12) to improve accuracy for identifying the subscriber on future occasions, for interpreting the subscriber's gesture and/or speech commands on future occasions, and for interpreting the intent of the subscriber when no subscriber commands are given.

At block 325, by using data captured from multiple sensors 20 (which are at different graphical locations and different angles (thus providing different perspectives of the subscriber being monitored and tracked), the network management computer 10 applies knowledge of sensor locations (e.g., cameras, scanning devices, etc.) and angles to track the subscriber and enhance analysis accuracy. Enhancing analysis accuracy is utilized to view commands from different angles to correctly identify the commands.

By utilizing profiles, models, records associated with identified subscriber (e.g., previously stored in the private subscriber database 12 for the identified subscriber), the network management computer 10 determines whether one or more commands are given by the subscriber at block 330. When the command is determined to be given, the network management computer 10 also determines what exactly the command is that has been given by the subscriber. The sensors 20 may capture the subscriber input in at least two forms which are speech and gesture commands, and the network management computer 10 continuously analyzes the captured data to identify the command that has been given.

When it is determined that no command is given by the subscriber, the network management computer 10 continues receiving data of the subscriber (from the various sensors 20) and tracking the subscriber throughout the environment 200. Concurrently, the network management computer 10 monitors and analyzes environment, body language of the subscriber, and subscriber previously provided data to identify opportunities to enhance the subscriber's experience/life at block 340. Based on determining/inferring the intent of the subscriber and/or identifying an opportunity to enhance the subscriber's experience/life, the network management computer 10 performs, triggers, initiates, and/or starts the actions associated with the inferred/identified subscriber benefits and intent at block 345.

During the process flow 300, cameras and microphones (of the sensors 20) along with other input sources can be used to apply context to user interactions to simplify inputs and/or enhance accuracy. Emotional/mental state can be inferred from body language, speech cues, and other behavioral indicators (e.g., purchasing activity). Based on analysis of the behavioral indicators by the network management computer 10, these and other sources of information can enable the network management computer 10 to act on behalf of the user to accomplish tasks for the subscriber, provide information to recipients without being prompted, and/or apply custom settings/conditions to connected systems and devices. If this information and/or any information is to be supplied to the subscriber, this information can be communicated to the subscriber via projection onto a surface by the output device 30 such as audio projection by the output device 30, via a display screen of the output device 30, and/or through connected devices (e.g., the subscriber may have her wearable device 32 or subscriber owned device (i.e., phone). Reference for sound transmitted in narrow beams can be made to "Sound From Ultrasound: The Parametric Array as an Audible Sound Source" by F. Joseph Pompei, published by the Massachusetts Institute of Technology, June 202, which is herein incorporated by reference.

Just as subscriber input is through the sensors 20 (not owned by the subscriber), so to can information from the network management computer 10 (including communications from other individual pre-selected by the subscriber) be supplied to the subscriber through these output devices 30 not owned by the subscriber. These output devices 30 may be used to provide some and/or all of a projected image, sound, and other indicators/notifications as noted herein. As one example, assume that a sender (e.g., child, spouse, and/or preselected contact of the subscriber) needs to communicate a message to the subscriber who is not in possession of her subscriber owned device. By the sender utilizing his own subscriber owned device and/or presenting speech and gesture commands to the network management computer 10, the sender instructs the network management computer 10 to find the subscriber wife and display/speak the urgent message. The sender needing to communicate the message to the subscriber has to instruct the network management computer 10 where to begin searching to find for the subscriber. For example, the sender may instruct the network management computer 10 to check the subscriber car (which has camera and microphone sensors 20 and output devices 30), check the downtown of a particular named city, and/or to check within a particular radius on a map. In one case, the subscriber may periodically check-in with the network management computer 10 by presenting herself in front of the nearest sensor 20 for identification, which allows the network management computer 10 to track the last location of the subscriber. As such, the network management computer 10 may inform the sender that the subscriber is at location X and/or was last identified at location X. Accordingly, the network management computer 10 searches for the subscriber at a radius around location X in addition to the locations identified by the sender. Searching (by the network management computer 10) for the subscriber includes reviewing past captured data within a timeframe (e.g., past 10, 20, 30 . . . 60, 90 minutes) to determine if the subscriber was previously captured, along with searching currently captured data to identify the subscriber. The sender instruct the timeframe (how far in the past) to search. If the subscriber happed to check-in with the network management computer 10 and/or if the network management computer 10 searches and finds the subscriber, network management computer 10 informs the subscriber that she has the message from sender waiting. The network management computer 10 can now display and speak the message to the subscriber.

Embodiments enable a subscriber to utilize connected cars, connected homes, and cities in place of (or in addition to) traditional mobile devices. Embodiments are aligned with trends that are just beginning such as wearable computing (e.g. Google glass, smart watches, etc. . . . ). Embodiments provide the ability to interact directly with the wired/wireless communication network 100 which eliminates and/or minimizes the difficulties associated with contacting emergency services without a functioning mobile device (subscribed owned device). For example, the network management computer 10 is able to recognize a speech command, voice command, and/or intent for emergency services, and accordingly the network management computer 10 calls to send emergency services to the identified location, even if the user is not a subscriber to the communication services of the carrier who owns the communication network 100. Further, this can be extended by eliminating issues associated with different carrier networks. The network management computer 10 can contact emergency services regardless of whether or not the user subscribes to the communication network 100 that captures the gesture and/or speech requesting emergency services. This same ability to interact with individuals regardless of carrier subscription has benefits linked to the inverse scenarios. The network management computer 10 can now alert individuals of threats and guide them to safety regardless of subscription status via the sensors 20 and output devices 30 as noted above.

Further, embodiments permit software application developers to design software applications which utilize at least part of the communication network 100 via an API. Users and/or application developers may be able to customize the gestures, speech, colors, images, etc., used to exchange information between the subscriber and the communication network 100 (via the network management computer 10). Cloud based storage (e.g., on distributed network management computers 10) can be incorporated to handle the storage needs associated with eliminating handheld mobile devices.

Figure 4:
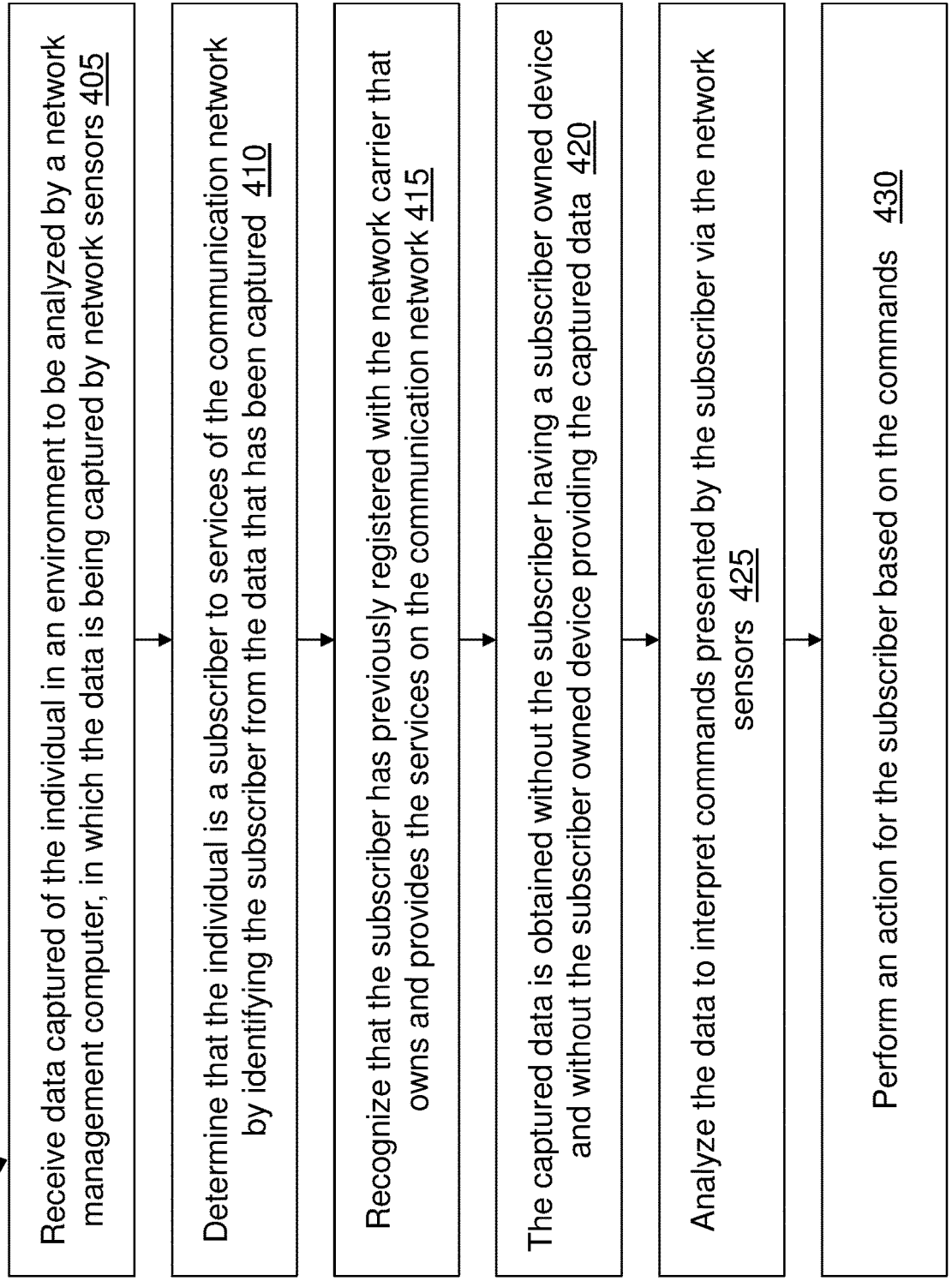
FIG. 4 illustrates a method for direct interaction between an individual and the communication network according to exemplary embodiments.

Now turning to FIG. 4, a method 400 is illustrated for direct interaction between an individual and the communication network 100 according to an exemplary embodiment. Reference can be made to FIGS. 1-3 along with FIG. 5 discussed below. Any device discussed herein may utilize features of a computer 500 discussed below including features such as processors 510, memory 520, and computer program code/computer executable instructions stored in the memory 520. Note that the network management computer 10 may perform various operations discussed herein, and in some cases, the network management computer 10 may direct/instruct other device to perform the operations. For example, the processor of the network management computer 10 may execute the operations, and/or the network management computer 10 may instruct one or more processors in remote devices to perform the desired operations.

The network management computer 10 continuously receives captured data of the individual in an environment (such as the environment 200) to be analyzed for services, and the data is continually being captured by network sensors 20 at block 405.

The network management computer 10 determines that the individual is a subscriber to services of the communication network 100 by identifying the subscriber from the data that has been captured at block 410.

At block 415, the network management computer 10 determines (e.g., from registration files of all subscribers and/or from the subscriber's personal data in the private subscriber database 12) that the subscriber has previously registered with the network carrier (e.g., AT&T®) that owns and provides the services on the communication network 100 via the network management computer 10. If the network management computer 10 determines that the individual is not a subscriber to the communication services (i.e., the speech and gesture command services which require no subscriber/user owned device such as a cell phone) offered by the network carrier, the network management computer 10 denies the (non-subscriber owned device) services to the individual. Optionally, when the individual is identified/recognized as a past subscriber by the network management computer 10, the network management computer 10 asks the individual via the output devices 30 whether the individual wants to restore communication services (i.e., the past subscriber can register again for the services that require no subscriber owned device); when the individual responds with a yes speech and/or gesture command, the network management computer 10 immediately provides the communication services to the past subscriber as a regular subscriber as discussed herein. It is understood that if the individual has her own cell phone and is not registered as a subscriber for communication services, she may utilize normal cell phone access as understood by one skilled in the art.

At block 420, the captured data is obtained without the subscriber having a subscriber owned device and without the subscriber owned device providing the captured data. The captured data such as images (both still and moving) and speech captured of the subscriber is captured without, e.g., the subscriber having to use her subscriber owned device (cell phone) to input, record, and transmit images, speech commands, and gesture commands to the network management computer 10.

At block 425, the network management computer 10 analyzes the data to interpret commands presented by the subscriber via the network sensors 20. As noted herein, the options for the commands include gesture commands and voice commands presented by the subscriber. Even if another person, such as a bystander, a person passing by, and/or a friend intentionally attempting to trick the network management computer 10, is speaking or making gestures, the network management computer 10 only associates and acts on commands from the subscriber and does not acknowledge commands from the other person. The network management computer 10 may also confirm that the subscriber's command has been accepted and is going to be executed by displaying and/or speaking a confirmation message to the subscriber (by using a name and/or preselected alias/nickname for confirmation) via the output devices 30. The network management computer 10 may also ask (in a message) the subscriber to repeat the commands and/or inform the subscriber that the network management computer 10 is unable to execute the given commands. At this point, the subscriber can repeat the commands for execution by the network management computer 10.

At block 430, the network management computer 10 performs one or more actions for the subscriber based on the commands given by the subscriber, without requiring the subscriber to have a subscriber owned device.

The network management computer 10 coordinates tracking of the subscriber moving through the environment 200 based on the network sensors 20 capturing the data of the subscriber from one location to the next location. The network management computer 10 analyzes the data of the subscriber in the environment 200 to interpret the intent of the subscriber and identify opportunities for benefiting the subscriber all without the subscriber actively presenting the speech and/or gesture commands over the network sensors 20. Based on interpreting the inferred intent of the subscriber and opportunities for benefiting the subscriber, network management computer 10 determines actions to perform on behalf of the subscriber when the subscriber has not presented the commands over the network sensors 20 and/or by any subscriber owned device (including cell phones, smart watches, etc.). The network management computer 10 performs the actions on behalf of the subscriber and/or causes the actions to be executed on behalf of the subscriber based on the intent interpreted and opportunities for benefiting the subscriber. In one implementation, the network management computer 10 may direct the subscriber to a location of a nearest network output device 30 in order to communicate a request for confirmation of the intent of the subscriber when the nearest network output device 30 is not in an immediate vicinity of the subscriber. Once the subscriber has moved to the nearest network output device 30, the network management computer 10 display and/or audibly speak (e.g., via text to speech conversion) the request for confirmation of intent to the subscriber, thus confirming the intent to the subscriber through the nearest network output device. The subscriber can indicate yes or no commands to respectively affirm or deny the intent just interpreted by the network management computer 10. If the intent is confirmed as yes, the network management computer 10 carries out the corresponding actions. If no, the network management computer 10 does not execute the actions for intent.

As noted herein, the intent is inferred without instructions of the commands from the subscriber, and analysis (by the network management computer 10) for determining the intent of the subscriber is based on a model (e.g., previously stored in the private subscriber database 12) created from the data previously captured over a time period for the subscriber. The model of the subscriber is based on historical records, trends, habits, and mannerisms of the subscriber all captured and fed to the network management computer 10. The model is utilized by the network management computer 10 as a comparison to interpret the commands presented by the subscriber over the network sensors 20 and to infer intent of the subscriber when no commands are presented.

When the network management computer 10 determines and identifies that the individual is in fact the subscriber to services of the communication network from the data that has been captured, the network management computer 10 may identify the subscriber by facial recognition, gait recognition, speech pattern recognition, voice recognition, biomorph identification recognition (including finger print recognition, eye scan recognition, etc.), and other techniques for identification as understood by one skilled in the art. For example, the subscriber may have an identification card (e.g., with a barcode, such as a QR Code®) that is scanned by a reader and/or camera of the network sensor 20 to identify the subscriber. Identification of the subscriber allows the network management computer 10 to match the subscriber to the vast private subscriber data in the private subscriber database 12 for enhancing the subscriber's life/experience.

Further, coordinated tracking of the subscriber moving through the environment based on the network sensors capturing the data of the subscriber includes the network management computer 10 identifying the subscriber at different locations (such as the different locations A through Z as the subscriber traverses through the environment 200) via corresponding network sensors 20 at the respective locations. The addresses of each of the locations is known and stored in advance in the network management computer 10. Based on the model of past behavior for the subscriber previously stored in the private subscriber database 12, the network management computer 10 determines messages, phone calls, and changes in schedule as actions that need to be performed on behalf of the subscriber without the subscriber presenting these (and/or any) commands to the network sensors 20.

Also, the network management computer 10 may utilize the model of the past behavior for the subscriber to determine that the subscriber has a condition of the following: delayed in timing, ahead of time, involved in an emergency, and an anomaly in subscriber pattern. Based on any of the conditions, the network management computer 10 determining that the condition of the subscriber requires communication to predefined recipients.

The network sensors 20, through which the data is captured, are not owned and operated by the subscriber. Similarly, the network output devices 30, through which the request for confirmation is output, is not owned and operated by the subscriber. The network sensors 20 and/or network output devices 30 may be owned and installed by the network carrier (e.g., such as AT&T®), a city utilities/security department, a business entity (such as a local store owner who has agreed and previously signed up to allow her sensors and output devices to be utilized by the network carrier), etc. As such, the environment may include multiple homes registered for the services that utilize network output devices 30 and the network sensors 20, and/or the environment includes a city registered for the services that utilizes the network output devices 30 and the network sensors 20 dispersed at various locations throughout streets of the city.

The network management computer 10 remotely connects to business output devices and business sensors of a business entity to communicate with the subscriber when the subscriber is determined to be in a vicinity of the business output devices and the business sensors. For example, the subscriber may move from network sensors 20 and network output device 30 owned by the network carrier to sensors 20 and output devices 30 owned by the particular business entity. In this case, the business entity having the business output devices and the business sensors has previously registered for the services in order to allow the network management computer 10 to communicate with and capture the data of the subscriber via the business output devices and the business sensors owned by the business entity. When the subscriber is in the vicinity of the business output devices 30, the network management computer 10 may display text, images, and video on a display screen of the business output devices 30 (including an electronic billboard, electronic sign, and so forth) to communicate a message personal to the subscriber by interrupting a business advertisement presented on the business output devices 30. Also, when the subscriber is in the vicinity of the business output devices 30, the network management computer 10 may project audio through speakers of the business output devices 30 to communicate the message personal to the subscriber. Once the message is finished and/or when the subscriber is no longer in the vicinity of the business entity, the network management computer 10 discontinues the message through the business output devices of the business entity to allow the business advertisement to resume on the business output devices. This process may repeat for various different subscribers who have registered for the communication services provided by the network carrier (such as AT&T®) over the communication network 100.

Although various example scenarios have been discussed for explanation purposes in which the sensors 20, access points 22, output devices 30, and/or the network management computer 10 are owned and/or controlled by the network provider/carrier (such as, e.g., AT&T®), embodiments are not meant to be limited. In some implementations, the equipment (the sensors 20, access points 22, output devices 30, and/or the network management computer 10) may be connected to the network, but may not be owned and/or controlled by the same network provider/carrier. Embodiments may include different combinations of entities and ownership, and the equipment may not be wholly owned and/or controlled by a single network provider/carrier as would be understood by one skilled in the art. Similarly, the database 12 and software application 15 may not be wholly owned and/or controlled by a single network provider/carrier.

Referring back to FIG. 2, consider a scenario in which each location A through Z is owned and/or controlled by different, various network providers/carriers who agree (in advance) to allow their respective equipment (sensors 20, access points 22, output devices 30, and/or the network management computer 10) along with databases 12 to be commonly utilized for providing the communication services discussed herein. For example, regardless of which entity owns and/or controls the sensors 20, the subscriber is able to present commands and be tracked as discussed herein. Likewise, regardless of which entity owns and/or controls the output devices 30, the network management computer 10 is able to communicate with the subscriber. In one case, the various network providers/carriers may implement a roaming service similar to wireless carriers. For example, the roaming allows the extension of connectivity service in a location that is different from the home location (e.g., the home network carrier) where the service was originally registered. Roaming ensures that the subscriber is kept connected to the communication network (and the network management computer 10), without losing the connection. Roaming allows the subscriber to travel outside the geographical coverage area of the home network carrier, by means of using a visited network carrier. Roaming is technically supported by management, authentication, authorization, and billing procedures as understood by one skilled in the art.

Figure 5:
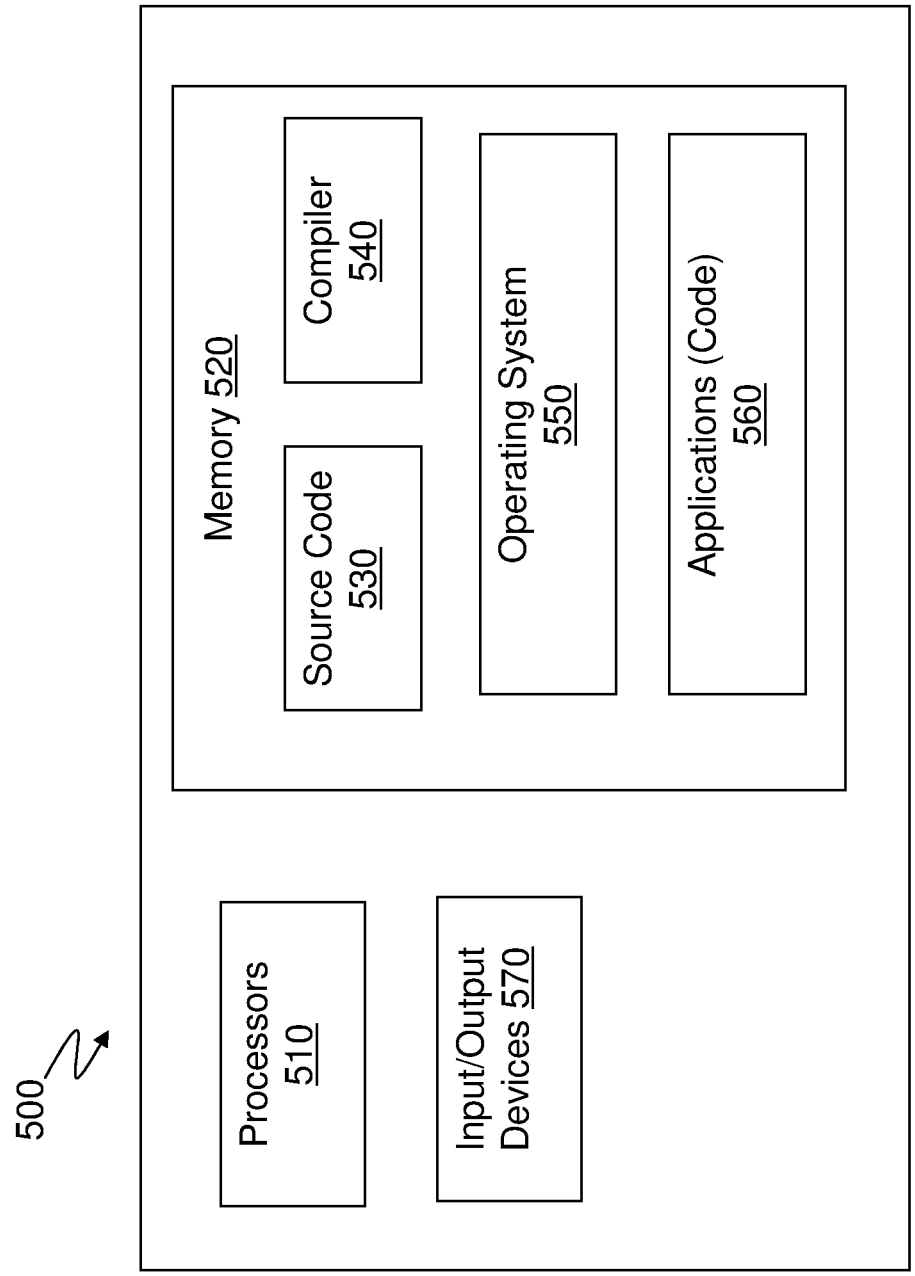
FIG. 5 illustrates an example of a computer having capabilities and features which may be included and/or incorporated in exemplary embodiments.

FIG. 5 illustrates an example of the computer 500 having capabilities, which may be included in exemplary embodiments. Various methods, procedures, circuits, elements, and techniques discussed herein may incorporate and/or utilize the capabilities of the computer 500. One or more of the capabilities of the computer 500 may be utilized to implement, to incorporate, to connect to, and/or to support any element discussed herein (as understood by one skilled in the art) in FIGS. 1-4. For example, the elements 10, 20, 22, 30, 32, 35, 40, and 45 may incorporate any of the hardware and software features discussed in FIG. 5.

Generally, in terms of hardware architecture, the computer 500 may include one or more processors 510, computer readable storage memory 520, and one or more input and/or output (I/O) devices 570 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 510 is a hardware device for executing software that can be stored in the memory 520. The processor 510 can be virtually any custom made or commercially available processor, a central processing unit (CPU), a data signal processor (DSP), or an auxiliary processor among several processors associated with the computer 500, and the processor 510 may be a semiconductor based microprocessor (in the form of a microchip) or a microprocessor.

The computer readable memory 520 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 520 may incorporate electronic, magnetic, optical, and/or other types of storage media. Note that the memory 520 can have a distributed architecture, where various components are situated remote from one another, but can be accessed by the processor 510.

The software in the computer readable memory 520 may include one or more separate programs, each of which comprises an ordered listing of executable instructions for implementing logical functions. The software in the memory 520 includes a suitable operating system (O/S) 550, compiler 540, source code 530, and one or more applications 560 of the exemplary embodiments. As illustrated, the application 560 comprises numerous functional components for implementing the features, processes, methods, functions, and operations of the exemplary embodiments. The application 560 of the computer 500 may represent numerous applications, agents, software components, modules, interfaces, controllers, etc., as discussed herein but the application 560 is not meant to be a limitation.

The operating system 550 may control the execution of other computer programs, and provides scheduling, input-output control, file and data management, memory management, and communication control and related services.

The application 560 may be a source program, executable program (object code), script, or any other entity comprising a set of instructions to be performed. When a source program, then the program is usually translated via a compiler (such as the compiler 540), assembler, interpreter, or the like, which may or may not be included within the memory 520, so as to operate properly in connection with the O/S 550. Furthermore, the application 560 can be written as (a) an object oriented programming language, which has classes of data and methods, or (b) a procedure programming language, which has routines, subroutines, and/or functions.

The I/O devices 570 may include input devices (or peripherals) such as, for example but not limited to, a mouse, keyboard, scanner, microphone, camera, etc. Furthermore, the I/O devices 570 may also include output devices (or peripherals), for example but not limited to, a printer, display, etc. Finally, the I/O devices 570 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 570 also include components for communicating over various networks, such as the Internet or an intranet. The I/O devices 570 may be connected to and/or communicate with the processor 510 utilizing Bluetooth connections and cables (via, e.g., Universal Serial Bus (USB) ports, serial ports, parallel ports, FireWire, HDMI (High-Definition Multimedia Interface), etc.).

When the computer 500 is in operation, the processor 510 is configured to execute software stored within the memory 520, to communicate data to and from the memory 520, and to generally control operations of the computer 500 pursuant to the software. The application 560 and the O/S 550 are read, in whole or in part, by the processor 510, perhaps buffered within the processor 510, and then executed.

When the application 560 is implemented in software, it should be noted that the application 560 can be stored on virtually any computer readable storage medium for use by or in connection with any computer related system or method. The application 560 can be embodied in any computer-readable medium for use by or in connection with an instruction execution system, apparatus, server, or device, such as a computer-based system, processor-containing system, or other system that can fetch the instructions from the instruction execution system, apparatus, or device and execute the instructions.

In exemplary embodiments, where the application 560 is implemented in hardware, the application 560 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

As described above, the exemplary embodiments can be in the form of processor-implemented processes and devices for practicing those processes, such as processor. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes a device for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc., do not denote any order or importance, but rather the terms first, second, etc., are used to distinguish one element from another. Furthermore, the use of the terms a, an, etc., do not denote a limitation of quantity, but rather denote the presence of at least one of the referenced item.

What is claimed is:

1. A method of direct interaction between an individual and a communication network, the method comprising:
   receiving data related to the individual in an environment, the data being captured in the environment by a network sensor without assistance from and unassociated with a subscriber-owned device, the environment of the network sensor capturing the data being a non-home environment of the individual;
   in response to receiving the data related to the individual in the non-home environment, authenticating, by a network services computer, that the individual is a subscriber to services of the communication network by identifying the individual as the subscriber from the data that has been captured by the network sensor in the non-home environment of the subscriber, the environment for capturing the data being unassociated in advance with the subscriber prior to the authenticating, the network sensor being registered to a different subscriber from the subscriber and configured to communicate without assistance from the subscriber-owned device, wherein both the network sensor in the non-home environment and the subscriber are associated with the services of the communication network, wherein the non-home environment for capturing the data corresponds to a location, the location being configured to vary in accordance with movement of the subscriber; and
   performing an action of the services on behalf of the subscriber based on the data.

2. The method of claim 1, wherein the subscriber and the network sensor are registered in advance with a network carrier that operates and provides the services on the communication network.

3. The method of claim 1, further comprising analyzing the data to interpret a command received from the subscriber via the network sensor.

4. The method of claim 3, wherein the command comprises a gesture command from the subscriber captured by the network sensor in the non-home environment of the subscriber.

5. The method of claim 3, wherein the command comprises speech of the subscriber.

6. The method of claim 3, wherein the command is configured to be analyzed to perform the action based on a mannerism of the subscriber.

7. The method of claim 3, wherein the command is configured to be analyzed to perform the action based on a persona of the subscriber.

8. The method of claim 3, wherein the command is configured to be analyzed to perform the action based on a mood of the subscriber.

9. The method of claim 1, further comprising coordinated tracking of the subscriber moving through the environment based on the network sensor capturing the data of the subscriber.

10. The method of claim 1, wherein the network sensor, through which the data is captured, is not owned and operated by the subscriber; and
   wherein the network sensor is not required to be in communication with the subscriber-owned device.

11. The method of claim 1, wherein the network sensor is associated with a business entity.

12. The method of claim 1, wherein the action performed on behalf of the subscriber is attributed to the subscriber; and
   wherein the data being captured by the network sensor is external to a home environment of the subscriber such that the environment is not the home environment.

13. An apparatus comprising:
   a processor; and
   memory comprising computer-executable instructions that, when executed by the processor, cause the processor to perform operations for direct interaction between an individual and a communication network, the operations comprising:
      receiving data related to the individual in an environment, the data being captured by a network sensor without assistance from and unassociated with a subscriber-owned device, the environment of the network sensor capturing the data being a non-home environment of the individual;
      in response to receiving the data related to the individual in the non-home environment, authenticating, by the processor, that the individual is a subscriber to services of the communication network by identifying the individual as the subscriber from the data that has been captured by the network sensor in the non-home environment of the subscriber, the environment for capturing the data being unassociated in advance with the subscriber prior to the authenticating, the network sensor being registered to a different subscriber from the subscriber and configured to communicate without assistance from the subscriber-owned device, wherein both the network sensor in the non-home environment and the subscriber are associated with the services of the communication network, wherein the non-home environment for capturing the data corresponding to a location, the location being configured to vary in accordance with movement of the subscriber; and performing an action of the services on behalf of the subscriber based on the data.

14. The apparatus of claim 13, wherein the subscriber and the network sensor are registered in advance with a network carrier that operates and provides the services on the communication network.

15. The apparatus of claim 13, wherein the operations further comprising analyzing the data to interpret a command received from the subscriber via the network sensor.

16. The apparatus of claim 15, wherein the command comprises a gesture command from the subscriber captured by the network sensor in the non-home environment of the subscriber.

17. The apparatus of claim 15, wherein the command comprises speech of the subscriber.

18. The apparatus of claim 15, wherein the command is configured to be analyzed to perform the action based on a mannerism of the subscriber.

19. A computer program product, tangibly embodied on a non-transitory computer readable medium, for direct interaction between an individual and a communication network, the computer program product including instructions that, when executed by a processor, cause the processor to perform operations comprising:

receiving data related to the individual in an environment, the data being captured in the environment by a network sensor without assistance from and unassociated with a subscriber-owned device, the environment of the network sensor capturing the data being a non-home environment of the individual;

in response to receiving the data related to the individual in the non-home environment, authenticating, by the processor, that the individual is a subscriber to services of the communication network by identifying the individual as the subscriber from the data that has been captured by the network sensor in the non-home environment of the subscriber, the environment for capturing the data being unassociated in advance with the subscriber prior to the authenticating, the network sensor being registered to a different subscriber from the subscriber and configured to communicate without assistance from the subscriber-owned device, wherein both the network sensor in the non-home environment and the subscriber are associated with the services of the communication network, wherein the non-home environment for capturing the data corresponds to a location, the location being configured to vary in accordance with movement of the subscriber; and performing an action of the services on behalf of the subscriber based on the data.

20. The computer program product of claim 19, wherein the subscriber and the network sensor are registered in advance with a network carrier that operates and provides the services on the communication network.

* * * * *